(12) United States Patent
Holmer

(10) Patent No.: US 8,908,767 B1
(45) Date of Patent: Dec. 9, 2014

(54) TEMPORAL MOTION VECTOR PREDICTION

(75) Inventor: Stefan Holmer, Tellusborgsvagen (SE)

(73) Assignee: Google Inc., Mountain View, CA (US)

( * ) Notice: Subject to any disclaimer, the term of this patent is extended or adjusted under 35 U.S.C. 154(b) by 381 days.

(21) Appl. No.: 13/369,671

(22) Filed: Feb. 9, 2012

(51) Int. Cl.
  H04N 11/04 (2006.01)
  H04N 11/02 (2006.01)
  H04N 19/583 (2014.01)
  H04N 19/51 (2014.01)

(52) U.S. Cl.
  CPC ... H04N 19/00709 (2013.01); H04N 19/00684 (2013.01); H04N 19/00733 (2013.01)
  USPC .................................................. 375/240.16

(58) Field of Classification Search
  None
  See application file for complete search history.

(56) References Cited

U.S. PATENT DOCUMENTS

| | | | |
|---|---|---|---|
| 4,924,310 A | 5/1990 | von Brandt | |
| 5,148,269 A | 9/1992 | de Haan et al. | |
| 5,337,086 A | 8/1994 | Fujinami | |
| 5,398,068 A | 3/1995 | Liu et al. | |
| 5,512,952 A | 4/1996 | Iwamura | |
| 5,610,658 A | 3/1997 | Uchida et al. | |
| 5,731,840 A | 3/1998 | Kikuchi et al. | |
| 5,742,710 A | 4/1998 | Hsu et al. | |
| 5,886,742 A | 3/1999 | Hibi et al. | |
| 5,987,180 A | 11/1999 | Reitmeier | |
| 5,991,447 A | 11/1999 | Eifrig et al. | |
| 6,005,980 A | 12/1999 | Eifrig et al. | |
| 6,011,870 A | 1/2000 | Jeng et al. | |
| 6,014,181 A | 1/2000 | Sun | |
| 6,058,143 A * | 5/2000 | Golin | 375/240.16 |
| 6,272,179 B1 | 8/2001 | Kadono | |
| 6,289,049 B1 | 9/2001 | Kim et al. | |

(Continued)

FOREIGN PATENT DOCUMENTS

| | | |
|---|---|---|
| EP | 0634873 B1 | 9/1998 |
| EP | 0979011 | 2/2000 |

(Continued)

OTHER PUBLICATIONS

Peng, Qiang, T. Yang, and C Zhu, "Block-based temporal error concealment for video packet using motion vector extrapolation", 2002 International Conference on Communications, Circuits and Systems and West Sino Exposition Proceedings, 10-14 vol. 1;2 vol. (Iii+xIiii+1787), IEEE, 2002.*

(Continued)

Primary Examiner — William C Vaughn, Jr.
Assistant Examiner — Michael Bennett
(74) Attorney, Agent, or Firm — Young Basile Hanlon & MacFarlane P.C.

(57) ABSTRACT

Taught herein are techniques to incorporate temporal motion vector prediction in encoding and decoding a video stream. Motion vectors are temporally predicted for blocks of a frame. An extrapolated position for at least one block of a first frame is predicted in a second frame using a respective motion vector of the at least one block. A temporal motion vector for a block of the second frame is calculated as a combination of respective motion vectors of blocks overlapping the block of the second frame if at least one of the overlapping blocks is an extrapolated block at the extrapolated position. The temporal motion vector is used in a motion estimation algorithm to select a motion vector for the block, and the block is encoded using the selected motion vector.

19 Claims, 6 Drawing Sheets

(56) References Cited

U.S. PATENT DOCUMENTS

| | | | |
|---|---|---|---|
| 6,359,929 B1 | 3/2002 | Boon | |
| 6,381,277 B1 | 4/2002 | Chun et al. | |
| 6,507,617 B1 | 1/2003 | Karczewicz et al. | |
| 6,711,211 B1 | 3/2004 | Lainema | |
| 6,735,249 B1 | 5/2004 | Karczewicz et al. | |
| 6,912,255 B2 | 6/2005 | Drezner et al. | |
| 7,418,147 B2 | 8/2008 | Kamaci et al. | |
| 7,463,685 B1 | 12/2008 | Haskell et al. | |
| 7,580,456 B2 | 8/2009 | Li et al. | |
| 7,606,310 B1 | 10/2009 | Ameres | |
| 7,978,770 B2 | 7/2011 | Luo et al. | |
| 8,005,144 B2 | 8/2011 | Ji et al. | |
| 8,059,719 B2* | 11/2011 | Paniconi et al. | 375/240.16 |
| 8,085,847 B2* | 12/2011 | Lee et al. | 375/240.16 |
| 2002/0031272 A1 | 3/2002 | Bagni et al. | |
| 2004/0028131 A1 | 2/2004 | Ye et al. | |
| 2004/0258155 A1 | 12/2004 | Lainema et al. | |
| 2005/0243926 A1 | 11/2005 | Hubrich et al. | |
| 2005/0254719 A1 | 11/2005 | Sullivan | |
| 2006/0114989 A1 | 6/2006 | Panda | |
| 2006/0209961 A1 | 9/2006 | Han et al. | |
| 2008/0025390 A1 | 1/2008 | Shi et al. | |
| 2008/0043845 A1 | 2/2008 | Nakaishi | |
| 2008/0056354 A1 | 3/2008 | Sun et al. | |
| 2008/0084931 A1 | 4/2008 | Kondo et al. | |
| 2008/0240242 A1 | 10/2008 | Lainema | |
| 2008/0247465 A1* | 10/2008 | Xin et al. | 375/240.16 |
| 2008/0291285 A1 | 11/2008 | Shimizu | |
| 2009/0016439 A1 | 1/2009 | Thoreau et al. | |
| 2009/0110077 A1 | 4/2009 | Amano et al. | |
| 2010/0079624 A1 | 4/2010 | Miyasako | |
| 2010/0284469 A1 | 11/2010 | Sato et al. | |
| 2011/0026820 A1 | 2/2011 | Strom et al. | |
| 2011/0170597 A1 | 7/2011 | Shi et al. | |
| 2011/0261886 A1 | 10/2011 | Suzuki et al. | |
| 2011/0293010 A1 | 12/2011 | Jeong et al. | |
| 2012/0075535 A1 | 3/2012 | Van Beek | |
| 2012/0288001 A1* | 11/2012 | Huang | 375/240.16 |

FOREIGN PATENT DOCUMENTS

| | | |
|---|---|---|
| EP | 1091592 | 4/2001 |
| WO | WO9941912 | 8/1999 |
| WO | WO03043342 | 5/2003 |

OTHER PUBLICATIONS

Nokia, Inc., Nokia Research Center, "MVC Decoder Description", Telecommunication Standardization Sector, Study Period 1997-2000, Geneva, Feb. 7, 2000, 99 pp.

Series H: Audiovisual and Multimedia Systems, "Infrastructure of audiovisual services—Coding of moving video, Video coding for low bit rate communication", International Telecommunication Union, ITU-T Recommendation H.263, Feb. 1998, 167 pp.

Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.

Chen, Xing C., et al.; "Quadtree Based Adaptive Lossy Coding of Motion Vectors", IEEE 1996, 4 pp.

Schiller, H., et al.; "Efficient Coding of Side Information in a Low Bitrate Hybrid Image Coder", Signal Processing 19 (1990) Elsevier Science Publishers B.V. 61-73, 13 pp.

Strobach, Peter; "Tree-Structured Scene Adaptive Coder", IEEE Transactions on Communications, vol. 38, No. 4, Apr. 1990, 10 pp.

Steliaros, Michael K., et al.; "Locally-accurate motion estimation for object-based video coding", SPIE vol. 3309, 1997, 11 pp.

Martin, Graham R., et al.; "Reduced Entropy Motion Compensation Using Variable Sized Blocks", SPIE vol. 3024, 1997, 10 pp.

Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.

Liu, Bede, et al.; "New Fast Algorithms for the Estimation of Block Motion Vectors", IEEE Transactions on Circuits and Systems for Video Technology, vol. 3, No. 2, Apr. 1993, 10 pp.

Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp.

Guillotel, Philippe, et al.; "Comparison of motion vector coding techniques", SPIE vol. 2308, 1994, 11 pp.

Orchard, Michael T.; "Exploiting Scene Structure in Video Coding", IEEE 1991, 5 pp.

Liu, Bede, et al.; "A simple method to segment motion field for video coding", SPIE vol. 1818, Visual Communications and Image Processing 1992, 10 pp.

Ebrahimi, Touradj, et al.; "Joint motion estimation and segmentation for very low bitrate video coding", SPIE vol. 2501, 1995, 12 pp.

Karczewicz, Maria, et al.; "Video Coding Using Motion Compensation With Polynomial Motion Vector Fields", IEEE COMSOC EURASIP, First International Workshop on Wireless Image/Video Communications—Sep. 1996, 6 pp.

Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.

Wiegand, Thomas, et al.; "Long-Term Memory Motion-Compensated Prediction", Publication Unknown, Date Unknown, 15 pp.

Chen, Michael C., et al.; "Design and Optimization of a Differentially Coded Variable Block Size Motion Compensation System", IEEE 1996, 4 pp.

Orchard, Michael T.; "Predictive Motion-Field Segmentation for Image Sequence Coding", IEEE Transactions on Circuits and Systems for Video Technology, vol. 3, No. 1, Feb. 1993, 17 pp.

Nicolas, H., et al.; "Region-based motion estimation using deterministic relaxation schemes for image sequence coding", IEEE 1992, 4 pp.

Luttrell, Max, et al.; "Simulation Results for Modified Error Resilient Syntax With Data Partitioning and RVLC", ITU—Telecommunications Standardization Sector, Study Group 16, Video Coding Experts Group (Question 15), Sixth Meeting: Seoul, South Korea, Nov. 2, 1998, 34 pp.

Bankoski et al. "Technical Overview of VP8, an Open Source Video Codec for the Web". Dated Jul. 11, 2011.

Bankoski et al. "VP8 Data Format and Decoding Guide" Independent Submission. RFC 6389, Dated Nov. 2011.

Bankoski et al. "VP8 Data Format and Decoding Guide; draft-bankoski-vp8-bitstream-02" Network Working Group. Internet-Draft, May 18, 2011, 288 pp.

Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.

Mozilla, "Introduction to Video Coding Part 1: Transform Coding", Video Compression Overview, Mar. 2012, 171 pp.

Overview; VP7 Data Format and Decoder. Version 1.5. On2 Technologies, Inc. Dated Mar. 28, 2005.

Series H: Audiovisual and Multimedia Systems; Infrastructure of audiovisual services—Coding of moving video. H.264. Advanced video coding for generic audiovisual services. International Telecommunication Union. Version 11. Dated Mar. 2009.

Series H: Audiovisual and Multimedia Systems; Infrastructure of audiovisual services—Coding of moving video. H.264. Advanced video coding for generic audiovisual services. International Telecommunication Union. Version 12. Dated Mar. 2010.

Series H: Audiovisual and Multimedia Systems; Infrastructure of audiovisual services—Coding of moving video. H.264. Amendment 2: New profiles for professional applications. International Telecommunication Union. Dated Apr. 2007.

Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.

(56) References Cited

OTHER PUBLICATIONS

Series H: Audiovisual and Multimedia Systems; Infrastructure of audiovisual services—Coding of moving video; Advanced video coding for generic audiovisual services. H.264. Version 1. International Telecommunication Union. Dated May, 2003.
Series H: Audiovisual and Multimedia Systems; Infrastructure of audiovisual services—Coding of moving video; Advanced video coding for generic audiovisual services. H.264. Version 1. International Telecommunication Union. Dated May 2003.
Series H: Audiovisual and Multimedia Systems; Infrastructure of audiovisual services—Coding of moving video; Advanced video coding for generic audiovisual services. H.264. Version 3. International Telecommunication Union. Dated Mar. 2005.
VP6 Bitstream & Decoder Specification. Version 1.02. On2 Technologies, Inc. Dated Aug. 17, 2006.
VP6 Bitstream & Decoder Specification. Version 1.03. On2 Technologies, Inc. Dated Oct. 29, 2007.
VP8 Data Format and Decoding Guide. WebM Project. Google On2. Dated: Dec. 1, 2010.
Cassidy, Sean, An Analysis of VP8, a New Video Codec for the Web, Nov. 2011, Rochester Institute of Technology, Rochester NY.
Introduction to Video Coding, http://people.xiph.org/tterrible/pubs/lca2012/auckland/intro_to_video1.pdf, Last accessed May 7, 2012.
Wright, R. Glenn, et al.; "Multimedia—Electronic Technical Manual for ATE", IEEE 1996, 3 pp.
Zhang, Kui, et al.; "Variable Block Size Video Coding With Motion Prediction and Motion Segmentation", SPIE vol. 2419, 1995, 9 pp.

\* cited by examiner

TEMPORAL MOTION VECTOR PREDICTION

TECHNICAL FIELD

The present invention relates in general to video encoding and decoding and in particular to using temporal motion vector prediction in encoding and decoding.

BACKGROUND

Digital video streams typically represent video using a sequence of frames (i.e. still images). An increasing number of applications today make use of digital video stream encoding for purposes other than traditional moving pictures (such as movies and video clips). For example, screen capture and screen casting applications generally represent the output of a computer monitor over time as a digital video stream, irrespective of the specialized nature of the content of the monitor. To permit transmission of digital video streams while limiting bandwidth consumption, a number of video compression schemes have been devised.

One such scheme encodes a frame and uses motion vectors to predict spatial movement of portions of the frame in another frame. By encoding the motion vectors and the differences between the image data in portions in each frame, the bandwidth needed to encode the image data can be reduced.

SUMMARY

Disclosed herein are embodiments of systems, methods and apparatuses for encoding and subsequently decoding a video signal that uses temporally-predicted motion vectors. According to an aspect of one embodiment taught herein, a method for encoding a video stream including a plurality of frames wherein each of the frames has a plurality of blocks comprises predicting an extrapolated position for at least one block of a first frame in a second frame using a respective motion vector of the at least one block. Further, a temporal motion vector for a block of the second frame is calculated as a combination of respective motion vectors of blocks overlapping the block of the second frame if at least one of the overlapping blocks is an extrapolated block at the extrapolated position. The method also includes using the temporal motion vector in a motion estimation algorithm to select a motion vector for the block of the second frame, and encoding the block of the second frame using the selected motion vector.

Another aspect of embodiments of the invention comprises an apparatus for encoding a video stream having a plurality of frames wherein each of the frames has a plurality of blocks. The apparatus in this example comprises a memory and a processor configured to execute instructions stored in the memory. The instructions cause the processor to predict an extrapolated position for at least one block of a first frame in a second frame using a respective motion vector of the at least one block, calculate a temporal motion vector for a block of the second frame as a combination of respective motion vectors of blocks overlapping the block of the second frame if at least one of the overlapping blocks is an extrapolated block at the extrapolated position, use the temporal motion vector in a motion estimation algorithm to select a motion vector for the block of the second frame, and encode the block of the second frame using the selected motion vector.

Yet another aspect of embodiments of the invention comprises a method for decoding a video stream including a plurality of frames, each of the frames having a plurality of blocks, and the method comprising receiving a compressed bitstream including data representing a first frame, a second frame, motion vectors of the first frame and codes indicating how to select motion vectors for the second frame, decoding at least one block of the first frame, predicting an extrapolated position for the at least one decoded block of the first frame in the second frame using a respective motion vector of the at least one decoded block, calculating a temporal motion vector for a block of the second frame as a combination of respective motion vectors of blocks overlapping the block of the second frame if at least one of the overlapping blocks is an extrapolated block at the extrapolated position, using the temporal motion vector in a motion estimation algorithm to select a motion vector for the block of the second frame according to the code associated with the block of the second frame, and decoding the block of the second frame using the selected motion vector.

These and other embodiments of the invention are described in additional detail hereinafter.

BRIEF DESCRIPTION OF THE DRAWINGS

The description herein makes reference to the accompanying drawings wherein like reference numerals refer to like parts throughout the several views, and wherein:

FIGS. 6A-6C are diagrams illustrating the temporal prediction of motion vectors of a current frame using motion vectors of a previous frame wherein FIG. 6A is a diagram of the previous frame showing motion vectors of certain of its blocks, FIG. 6B is a diagram showing extrapolated blocks in the current frame using the motion vectors of the previous frame, and FIG. 6C is a diagram showing motion vectors generated by temporal prediction for certain blocks in the current frame.

DETAILED DESCRIPTION

Digital video is used for various purposes including, for example, remote business meetings via video conferencing, high definition video entertainment, video advertisements, and sharing of user-generated videos. As technology evolves, users have higher expectations for video quality and expect high resolution video even when transmitted over communications channels having limited bandwidth.

To permit transmission of digital video streams while limiting bandwidth consumption, video encoding and decoding schemes incorporate various compression schemes. These compression schemes generally break the image up into blocks and use one or more techniques to limit the amount of information included in a resulting digital video bitstream for transmission. The bitstream, once received, is then decoded to re-create the blocks and the source images from the limited information.

One technique used to limit information in the bitstream is to use motion vectors. In general, a set of motion vectors is encoded that specify how blocks have moved from one frame to the next. The blocks are compressed and put into the bitstream, along with residuals representing differences between image data of the blocks in their positions in one frame versus the image data of the blocks in the next frame. In this way, image data of the blocks placed in the bitstream is minimized.

Embodiments of this disclosure recognize that oftentimes an object in a particular image, such as a ball or person for example, has similar motion vectors from one frame to the next. For this reason, temporal correlation may be used to further compress the motion vectors during encoding.

Figure 1:
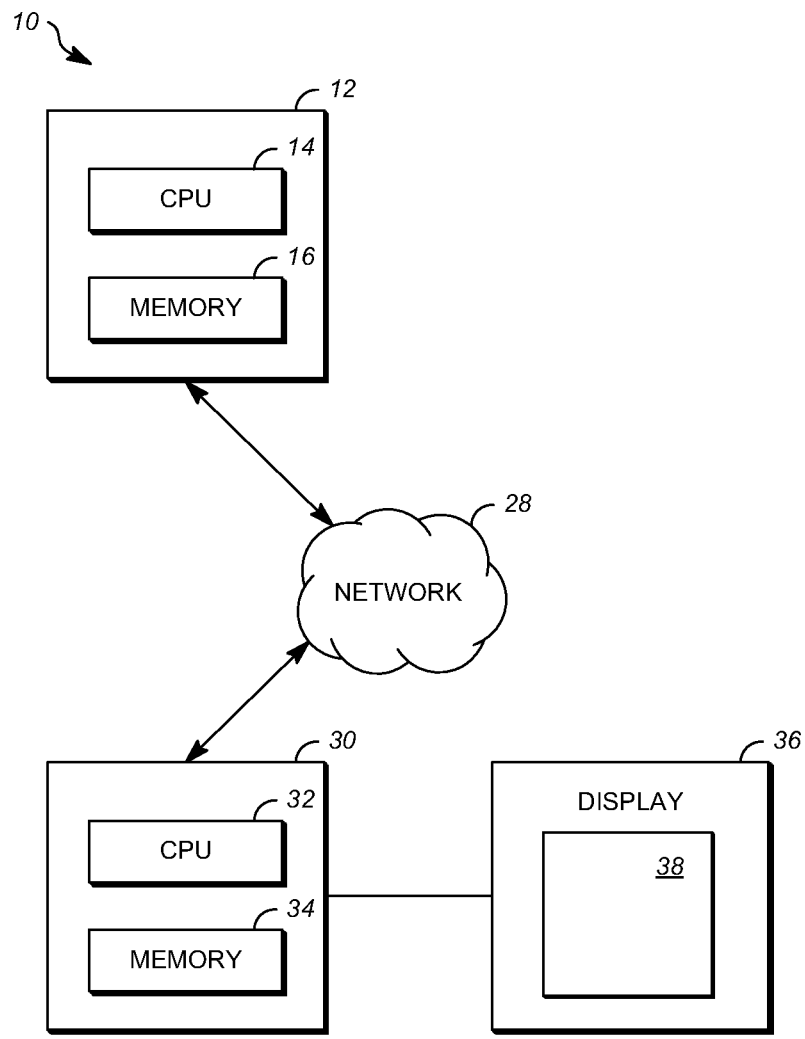
FIG. 1 is a schematic of a video encoding and decoding system.

FIG. 1 is a schematic of a video encoding and decoding system 10. An exemplary transmitting station 12 can be, for example, a computer having an internal configuration of hardware including a processor such as a central processing unit (CPU) 14 and a memory 16. CPU 14 is a controller for controlling the operations of the transmitting station 12. CPU 14 is connected to memory 16 by, for example, a memory bus. Memory 16 can be read only memory (ROM), random access memory (RAM) or any other suitable memory device. Memory 16 can store data and program instructions that are used by CPU 14. Other suitable implementations of transmitting station 12 are possible. For example, the processing of transmitting station 12 can be distributed among multiple devices.

A network 28 connects transmitting station 12 and a receiving station 30 for encoding and decoding of the video stream. Specifically, the video stream can be encoded in transmitting station 12 and the encoded video stream can be decoded in receiving station 30. Network 28 can be, for example, the Internet. Network 28 can also be a local area network (LAN), wide area network (WAN), virtual private network (VPN), a cellular telephone network or any other means of transferring the video stream from transmitting station 12 to, in this example, receiving station 30.

Receiving station 30, in one example, can be a computer having an internal configuration of hardware including a processor such as a CPU 32 and a memory 34. CPU 32 is a controller for controlling the operations of receiving station 30. CPU 32 is connected to memory 34 by, for example, a memory bus. Memory 34 can be ROM, RAM or any other suitable memory device. Memory 34 can store data and program instructions that are used by CPU 32. Other suitable implementations of receiving station 30 are possible. For example, the processing of receiving station 30 can be distributed among multiple devices.

A display 36 configured to display a video stream can be connected to receiving station 30. Display 36 can be implemented in various ways, including by a liquid crystal display (LCD), a cathode-ray tube (CRT) or a light emitting diode display (LED), such as an OLED display. Display 36 is coupled to CPU 32 and can be configured to display a rendering 38 of the video stream decoded by a decoder in receiving station 30.

Other implementations of encoder and decoder system 10 are possible. In the embodiments described, for example, an encoder is in transmitting station 12 and a decoder is in receiving station 30 as instructions in memory or a component separate from memory. However, an encoder or decoder can be coupled to a respective station 12, 30 rather than in it. Further, one implementation can omit network 28 and/or display 36. In another implementation, a video stream can be encoded and then stored for transmission at a later time to receiving station 30 or any other device having memory. In another implementation, additional components can be added to encoder and decoder system 10. For example, a display or a video camera can be attached to transmitting station 12 to capture the video stream to be encoded. In an exemplary implementation, the real-time transport protocol (RTP) is used for transmission. In another implementation, a transport protocol other than RTP may be used, e.g. an HTTP-based video streaming protocol.

Figure 2:
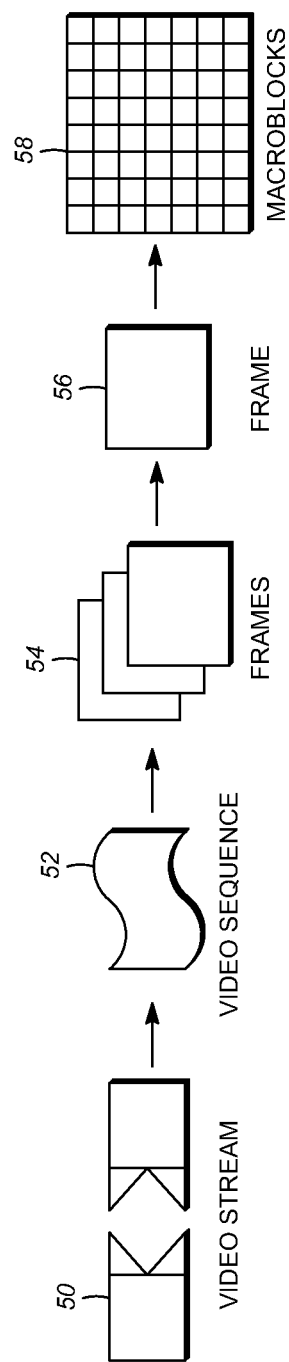
FIG. 2 is a diagram of a typical video stream to be encoded and decoded.

FIG. 2 is a diagram of a typical video stream 50 to be encoded and subsequently decoded. Video stream 50 includes a video sequence 52. At the next level, video sequence 52 includes a number of adjacent frames 54. While three frames are depicted as adjacent frames 54, video sequence 52 can include any number of adjacent frames. Adjacent frames 54 can then be further subdivided into individual frames, e.g. a single frame 56. At the next level, single frame 56 can be divided into a series of blocks 58, which can contain data corresponding to, for example, 16×16 pixels in frame 56. Each block 58 can contain luminance and chrominance data for the corresponding pixels. Blocks 58 can also be of any other suitable size such as 16×8 pixel groups or 8×16 pixel groups and can be further subdivided into smaller blocks depending on the application. Unless otherwise noted, the terms block and macroblock are used interchangeably herein.

Figure 3:
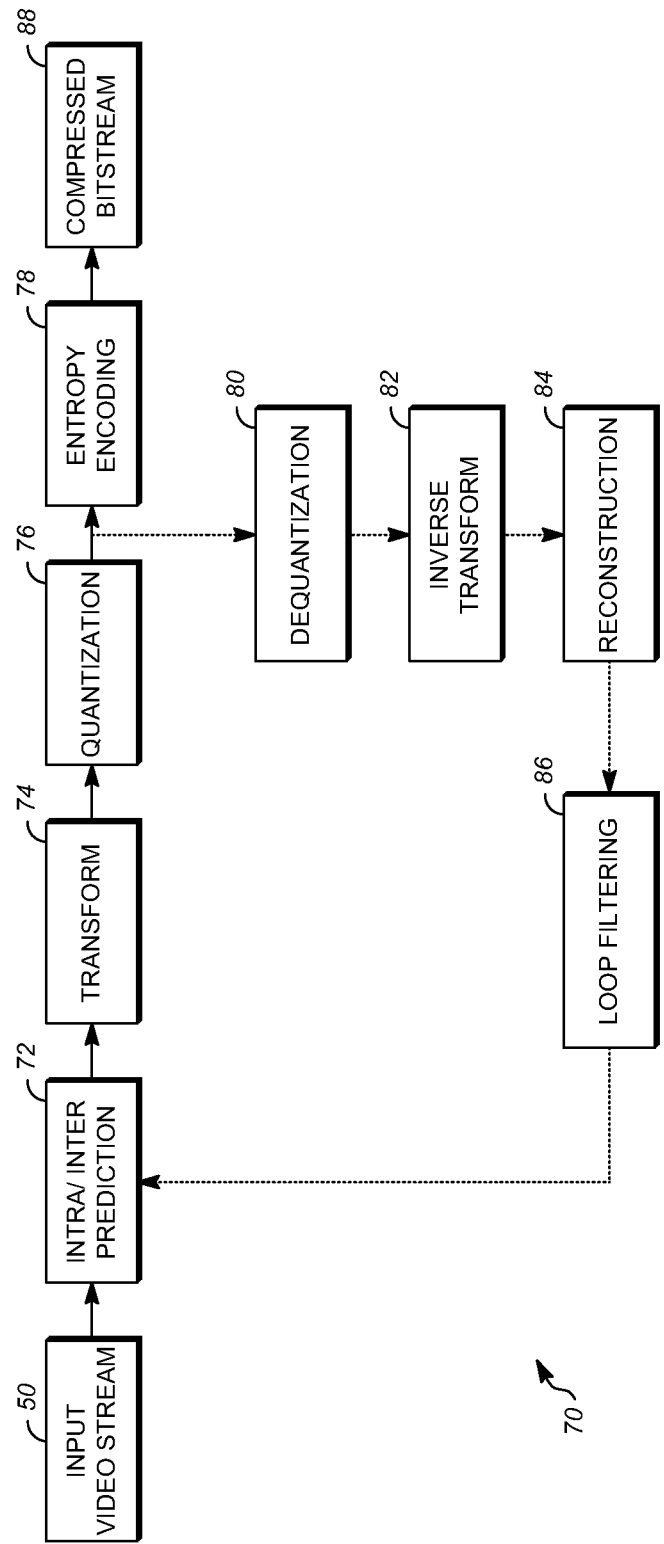
FIG. 3 is a block diagram of a video compression system in accordance with one embodiment.

FIG. 3 is a block diagram of an encoder 70 in accordance with one embodiment. Encoder 70 can be implemented, as described above, in transmitting station 12. Encoder 70 encodes input video stream 50. Encoder 70 has the following stages to perform the various functions in a forward path (shown by the solid connection lines) to produce an encoded or compressed bitstream 88: an intra/inter prediction stage 72, a transform stage 74, a quantization stage 76, and an entropy encoding stage 78. Encoder 70 may also include a reconstruction path (shown by the dotted connection lines) to reconstruct a frame for prediction and encoding of future blocks. In FIG. 3, encoder 70 has the following stages to perform the various functions in the reconstruction path: a dequantization stage 80, an inverse transform stage 82, a reconstruction stage 84, and a loop filtering stage 86. Other structural variations of encoder 70 can be used to encode video stream 50.

When video stream 50 is presented for encoding, each frame 56 within video stream 50 is processed in units of blocks. At intra/inter prediction stage 72, each block can be encoded using either intra-frame prediction (i.e., within a single frame) or inter-frame prediction (i.e. from frame to frame). In either case, a prediction block can be formed. In the case of intra-prediction, a prediction block can be formed from samples in the current frame that have been previously encoded and reconstructed. In the case of inter-prediction, a prediction block can be formed from samples in one or more previously constructed reference frames.

Next, still referring to FIG. 3, the prediction block can be subtracted from the current block at intra/inter prediction stage 72 to produce a residual block (residual). Transform stage 74 transforms the residual into transform coefficients in, for example, the frequency domain. Examples of block-based transforms include the Karhunen-Loève Transform (KLT), the Discrete Cosine Transform (DCT) and the Singular Value Decomposition Transform (SVD). In one example, the DCT transforms the block into the frequency domain. In the case of DCT, the transform coefficient values are based on spatial frequency, with the lowest frequency (i.e. DC) coefficient at the top-left of the matrix and the highest frequency coefficient at the bottom-right of the matrix.

Quantization stage 76 converts the transform coefficients into discrete quantum values, which are referred to as quantized transform coefficients. The quantized transform coefficients are then entropy encoded by entropy encoding stage 78. The entropy-encoded coefficients, together with other information used to decode the block, such as the type of prediction used, motion vectors and quantizer value, are then output to compressed bitstream 88. Compressed bitstream 88 can be formatted using various techniques, such as variable length encoding (VLC) and arithmetic coding.

The reconstruction path in FIG. 3 (shown by the dotted connection lines) can be used to help ensure that both encoder 70 and a decoder 100 (described below) use the same reference frames to decode compressed bitstream 88. The reconstruction path performs functions that are similar to functions that take place during the decoding process that are discussed in more detail below, including dequantizing the quantized transform coefficients at dequantization stage 80 and inverse transforming the dequantized transform coefficients at inverse transform stage 82 to produce a derivative residual block (derivative residual). At reconstruction stage 84, the prediction block that was predicted at intra/inter prediction stage 72 can be added to the derivative residual to create a reconstructed block. Loop filtering stage 86 can be applied to the reconstructed block to reduce distortion such as blocking artifacts.

Other variations of encoder 70 can be used to encode compressed bitstream 88. For example, a non-transform based encoder 70 can quantize the residual signal directly without transform stage 74. In another embodiment, encoder 70 may have quantization stage 76 and dequantization stage 80 combined into a single stage.

Figure 4:
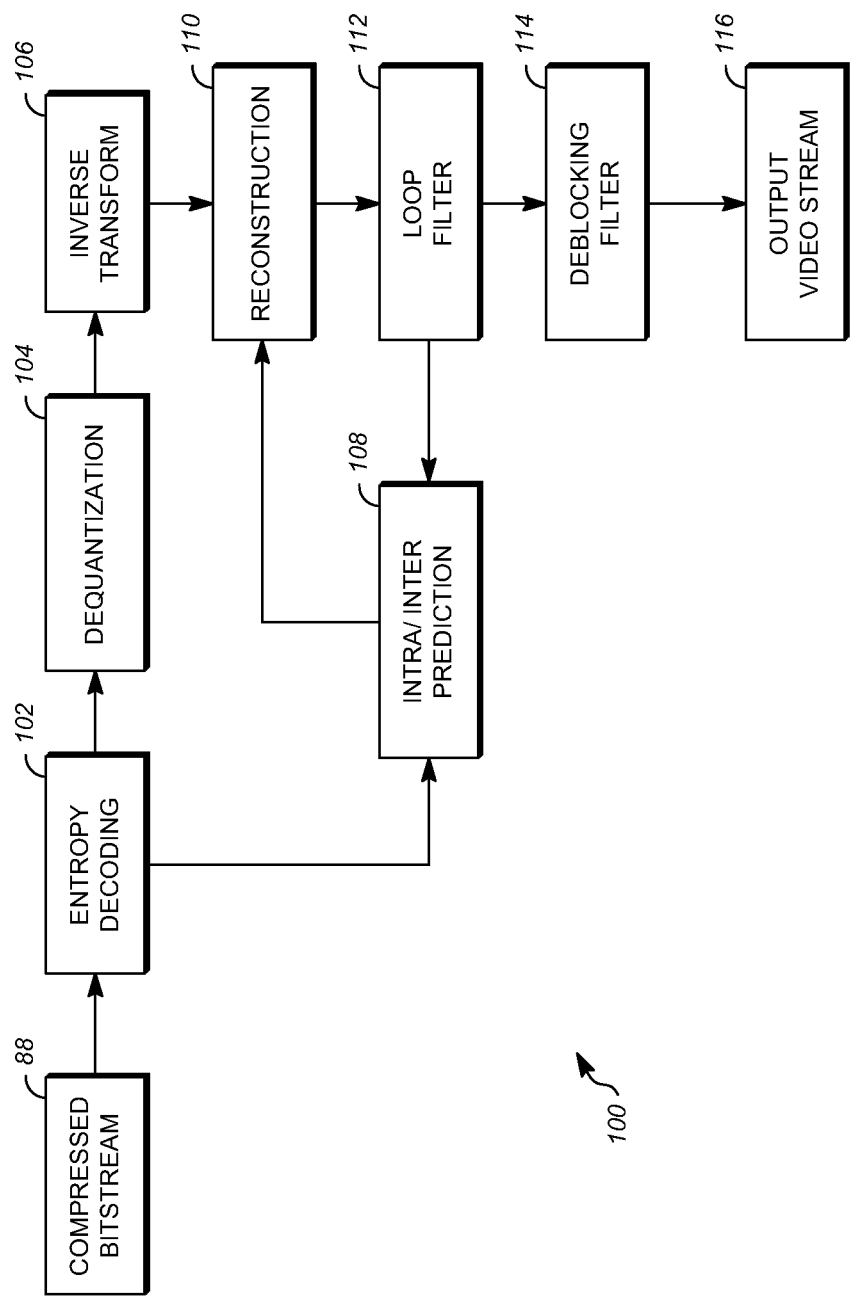
FIG. 4 is a block diagram of a video decompression system in accordance with another embodiment.

FIG. 4 is a block diagram of a decoder 100 in accordance with another embodiment of this disclosure. Decoder 100 can be implemented, as described above, in receiving station 30. Decoder 100, similar to the reconstruction path of encoder 70 discussed above, includes in one example the following stages to perform various functions to produce an output video stream 116 from compressed bitstream 88: an entropy decoding stage 102, a dequantization stage 104, an inverse transform stage 106, an intra/inter prediction stage 108, a reconstruction stage 110, a loop filtering stage 112 and a deblocking filtering stage 114. Other structural variations of decoder 100 can be used to decode compressed bitstream 88.

When compressed bitstream 88 is presented for decoding, the data elements within compressed bitstream 88 can be decoded by entropy decoding stage 102 to produce a set of quantized transform coefficients. Dequantization stage 104 dequantizes the quantized transform coefficients, and inverse transform stage 106 inverse transforms the dequantized transform coefficients to produce a derivative residual that can be identical to that created by reconstruction stage 84 in encoder 70. Using header information decoded from compressed bitstream 88, decoder 100 can use the intra/inter prediction stage 108 to create the same prediction block as was created in encoder 70. At reconstruction stage 110, the prediction block can be added to the derivative residual to create a reconstructed block. Loop filtering stage 112 can be applied to the reconstructed block to reduce blocking artifacts. Deblocking filtering stage 114 can be applied to the reconstructed block to reduce blocking distortion, and the result is output as output video stream 116.

Other variations of decoder 100 can be used to decode compressed bitstream 88. For example, decoder 100 can produce output video stream 116 without deblocking filtering stage 114.

As mentioned briefly above, intra/inter prediction stage 72 can implement prediction steps that attempt to reduce the amount of data in the video stream. One way to reduce artifacts while maintaining good compression rates is to determine the amount of change between blocks of a video frame and those of a prediction frame in a process called motion estimation. A prediction frame is also call a reference frame herein. As explained above, only the differences are transmitted. The reference frame is a constructed frame or an actual frame selected from the video stream. Often an immediately preceding or a closely preceding frame is used because the correlation between successive frames is high when the scene being viewed changes slowly.

When encoding, for example, a number of motion estimation algorithms can be used by intra/inter prediction stage 72 to search for the best block prediction within a defined search range for a current block at position (r,c) (also called block(r, c) herein), where r represents the row position of the block and c represents the column position of the block. Once the best block prediction is found, a motion vector mv(r,c) that points to the best prediction of block(r,c) can be determined. Motion vector mv(r,c) is generally encoded by selecting one of a number of available prediction modes so that the total cost is minimized or reduced. That is, trade-offs are made between decoded image quality and the number of bits used to encode an image. Minimizing any one of a number of known cost functions can be used to balance encoding size with distortion to the content of the frame resulting from encoding.

When a preceding frame is used for prediction, different inter prediction modes are available. For example, according to one implementation of an encoder and decoder, four different inter prediction modes can be used for temporal prediction of the content of a block based on scoring adjacent vectors. Adjacent vectors are the motion vectors of adjacent blocks at positions such as (r, c−1), (r−1, c−1), (r−1, c), etc., to the current block at position (r, c). The adjacent vectors can be scored based on how common that motion vector is in nearby blocks according to any number of known techniques. In this example, the first mode is called mv_nearest and uses the non-zero vector with the highest score that is spatially adjacent to the block. A second mode is called mv_near and uses the non-zero vector with the next highest score that is spatially adjacent to the block. The third mode is called mv_zero and is the zero vector. Finally, the vector with the highest score is called a best_mv motion vector predictor, and it is not necessary an adjacent vector. The fourth mode is called new_mv and uses a residual vector to be added to the best_mv motion vector predictor. More, fewer or different modes are also possible.

According to teachings of this disclosure, these prediction modes are extended to take temporal correlation of the motion vectors into account. Assuming for this implementation that an object is moving in the same direction (and with the same magnitude) between frame i−2 and i−1 as between frame i−1 and i, the temporal prediction of the motion vector mv(r,c) can be defined as mv_temporal(r,c), which is a vector which has been predicted from the motion vectors of the previous frame. One temporal prediction algorithm is described below with reference to FIGS. 5 and 6A-6C.

Figure 5:
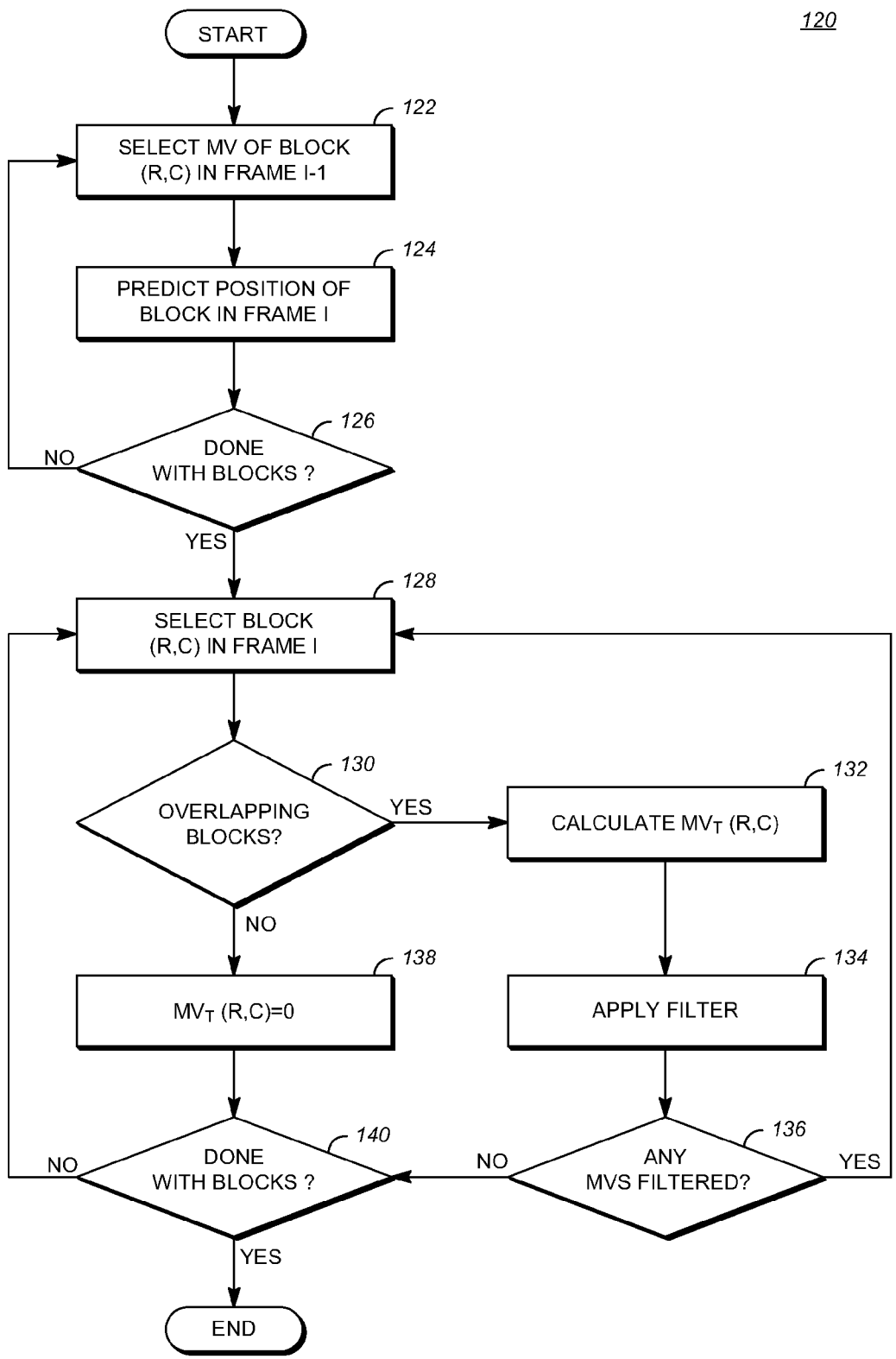
FIG. 5 is a flowchart of a temporal prediction algorithm according to one embodiment of this disclosure.

FIG. 5 is a flowchart of a temporal prediction algorithm 120 according to one embodiment of this disclosure. FIG. 5 uses motion vectors mv(i−1,r,c) of frame i−1 that are already calculated by known techniques or are previously provided to predict motion vectors mv(i,r,c) of frame i. The processing of FIG. 5 can be performed in raster order, but any other scan order is also possible. Starting with step 122, the motion vector of a first block at position (r,c) in frame i−1 is selected. Based on this motion vector, the position of the first block in frame i is extrapolated in step 124. Given the assumption that relative motion between frame i−2 and frame i−1 is similar to the relative motion between frame i−1 and frame i, objects in the frames will have similar relative movement but will be moving from a different position. For example, a block at position (r,c) in frame i−2 moves to position (r+5,c−1) in frame i−1, and therefore has the motion vector mv(i−1, r+5, c−1)=(−5,1). In step 124, that block, i.e., (r+5, c−1) of frame i−1, is extrapolated to position (r+10, c−2) in frame i. More generally, if block j of frame i−1 is at position $(r,c)_{i-1}$, its position (r,c) in frame i is represented by $(r,c)_i=(r,c)_{i-1}-mv_{i-1,j}$, where $mv_{i-1,j}$ is the motion vector of block j in frame i−1.

Note that the calculation described uses an example where the frame durations are the same between i−2, i−1 and i. However, the duration of frame i−2 may be longer or shorter than frame i−1, for example, so the motion vectors may need to be scaled according to the frame durations in order to get the correct magnitude. For example, if frame i−2 has a duration of 30 ms and frame i−1 has a duration of 15 ms, a vector used for extrapolation between frame i−1 and i can be scaled by 30/15=0.5 so that its magnitude is not doubled compared to the duration.

Once the position of the first block in frame i−1 is extrapolated in step 124, processing advances to step 126 to query whether other blocks of frame i−1 have been considered. If not, processing returns to step 122 to select the next block in frame i−1. If all blocks of frame i−1 have been considered, processing instead advances to step 126 to start processing the blocks in frame i. Note that the processing of steps 122 and 124 may result in blocks of frame i−1 that do not have a position in frame i.

In one embodiment, blocks in frame i−1 that refer to the golden frame or an alternative reference (alt-ref) frame are not extrapolated. This is because, in general, golden and alt-ref frames are frames in the past and are not necessarily a constant number of frames behind the current frame. As a result, it can be hard to correctly extrapolate motion vectors that refer to these frames. Consider the case where an object has moved from the upper left corner in frame 1 (stored in a golden reference buffer) to the lower right corner in frame 30. Between frame 30 and frame 29 the movement is relatively small, such as a couple of pixels towards the lower right corner. However, if a block in frame 30 is based, not on frame 29, but on frame 1 (stored in the golden reference buffer), the motion vector would be very long (across the whole frame). If that vector is used for extrapolating the block into the next frame (frame 31), the extrapolated block would be moved way out of the frame, which generally is no common movement between two sequential frames. Although such blocks are not extrapolated in this embodiment, they can be in other embodiments.

It is appreciated that there may be blocks in frame i that are not associated with any block of frame i−1 via extrapolation. Moreover, one or more extrapolated blocks may overlap the same block at position (r,c) in frame i. The processing starting in step 128 handles each of these situations. In step 128, a first block at position (r,c) in frame i is selected. Next step 130 queries whether overlapping blocks exist at position (r,c) in frame i. In one embodiment, step 130 queries whether at least one extrapolated block overlaps the current block (r,c). If so, a value mv_temporal(r,c) (also called $mv_i(r,c)$) is calculated as a combination of the motion vectors of the overlapping blocks, including any extrapolated block(s), that overlap current block (r,c) in frame i in step 132.

In an exemplary embodiment, the value mv_temporal(r,c) is a weighted value of the motion vectors of any overlapping blocks. The weight can be based on the area of overlap between the overlapping block and the current block, for example. According to one implementation of step 132, $mv\_temporal_{i,j}(r,c)$ for a block j at position (r,c) in frame i is calculated according to the following formula:

$$mv\_temporal_{i,j}(r, c) = \left(\sum_{k}^{N} A_{j,k} mv_k\right) / \sum_{k}^{N} A_{j,k};$$

wherein

N is the number of blocks k overlapping block j;

$mv_k$ is the motion vector of a block k at position (r,c), which is also called mv(i−1,r,c) when k is an extrapolated block from frame i−1; and $A_{j,k}$ is the area of overlap between the block k and block j.

In certain embodiments, it is desirable when calculating $mv\_temporal_{i,j}(r,c)$ to consider the number N of blocks k to include any portion of the current block (r,c) that is not overlapped by an extrapolated block as another overlapping block k. For example, if one extrapolated block overlaps block (r,c) with an area A0, and the total area of block (r,c), At, is greater than A0 (At>A0), then there is a zero motion vector overlap for At−A0. This area could be considered an overlapping "virtual" block in the calculation of $mv\_temporal_{i,j}(r,c)$ in step 132.

In an alternative embodiment, steps 130 and 138 (discussed hereinafter) could be omitted, and the calculations of step 132 could be performed for every block of frame i, including those blocks containing only overlapping virtual blocks, i.e., those without one or more overlapping extrapolated blocks. In this case, blocks in frame i only having an overlapping virtual block would have the zero vector as its temporal motion vector.

In yet another embodiment, a median filter is used to calculate $mv\_temporal_{i,j}(r,c)$ in step 132 instead of the weighted mean described above. In such a calculation, for example, the median of the row and columns components could be separately considered to form $mv\_temporal_{i,j}(r,c)$ according to:

$$mv\_temporal_{i,j}(r,c)=median(row\_component(mv_k)), median(column\_component(mv_k));$$

wherein median(row_component($mv_k$)) is the median row component of the set of motion vectors $mv_k$ associated with blocks k overlapping block j; and median(column_component($mv_k$)) is the median column component of the set of motion vectors $mv_k$ associated with blocks k overlapping block j.

Figure 6A:
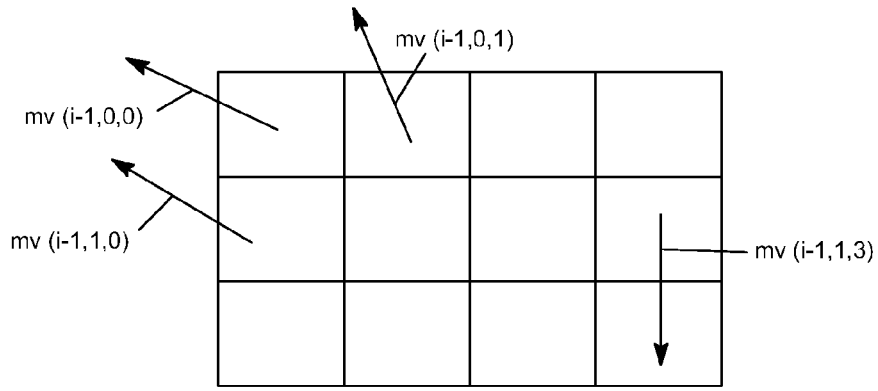
Figure 6B:
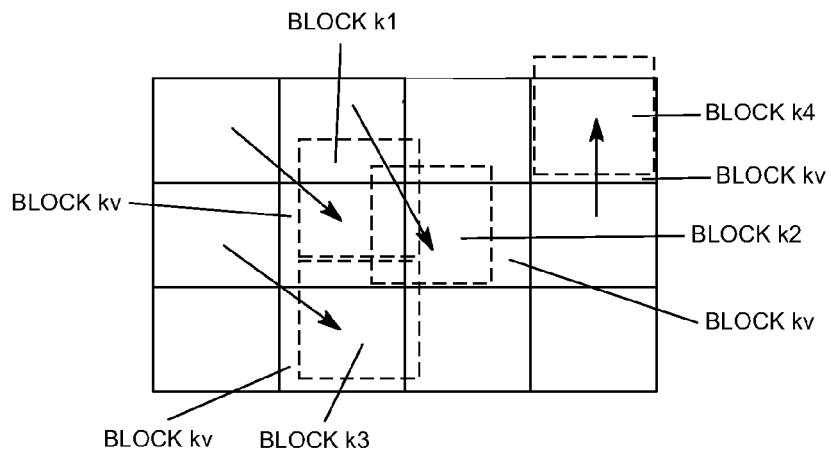
Figure 6C:
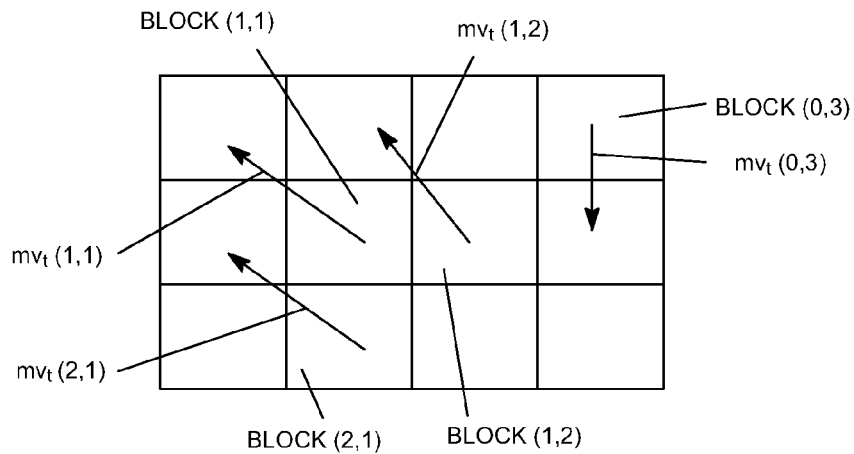

Steps 122 to 132 can be better understood by reference to FIGS. 6A-6C. FIGS. 6A-6C are diagrams illustrating the temporal prediction of motion vectors of a current frame using motion vectors of a previous frame. FIG. 6A is a diagram of the previous frame i−1 showing motion vectors of certain of its blocks. Namely, FIG. 6A shows previous frame i−1 having twelve (12) blocks arranged in an array where r=3 and c=4 and the top-left corner block is at position (0,0). Motion vectors for four blocks (0,0), (0,1), (1,0) and (1,3) are shown respectively as mv(i−1,0,0), mv(i−1,0,1), mv(i−1,1,0) and mv(i−1,1,3). In this example, the motion vector for each of the remaining blocks is the zero vector.

FIG. 6B is a diagram showing extrapolated blocks in the current frame i using the motion vectors mv(i−1,0,0), mv(i−1,0,1), mv(i−1,1,0) and mv(i−1,1,3) of the previous frame i−1. As can be seen from FIG. 6B, the extrapolated blocks in frame i generated in step 124 of FIG. 5 using each of motion vectors mv(i−1,0,0), mv(i−1,0,1), mv(i−1,1,0) and mv(i−1,1,3) of FIG. 6A are blocks k1 through k4, respectively. Certain blocks(r,c) in frame i having at least one overlapping extrapolated block are labeled in FIG. 6B, namely block(0,3), block (1,1), block(1,2) and block(2,1). Other such blocks are not labeled in FIG. 6B for ease of reading. A temporal motion vector $mv_t(r,c)$ for each of these blocks and others not labeled can be calculated in step 132 of FIG. 5 responsive to the query in step 130. In an embodiment, the calculation of $mv_t(r,c)$ includes considering any overlapping virtual blocks, certain of which are labeled as block kv in FIG. 6B.

FIG. 6C is a diagram showing motion vectors generated by temporal prediction for certain blocks in the current frame. Specifically, since block(0,3), block(1,1), block(1,2) and block (2,1) of FIG. 6B, among others, have overlapping blocks, temporal motion vectors $mv_t(0,3)$, $mv_t(1,1)$, $mv_t(1,2)$ and $mv_t(2,1)$ would be calculated in step 132. The number N of blocks overlapping each of block(1,1) and block(1,2) is four in this example, namely a block kv, block k1, block k2 and block k3. In contrast, the number of blocks overlapping each of block(0,3) and block(2,1) is two, namely block k4 and a block kv and block k3 and a block kv, respectively.

Since many motion search algorithms search for similar blocks rather than trying to find the real motion of a block, some of the motion vectors may be pointing to a completely different position than that expected. As a result, extrapolating using such a vector may result in a bad predictor. The processing of FIG. 5 addresses this by optionally applying an outlier filter to all motion vector candidates where an extrapolated block exists in frame i. More specifically, in step 134, $mv_k$ is discarded for any block k if:

$$\mathrm{any}((mv_k - mv\_temporal_{i,j}(r,c)) > x\sigma_j);$$

wherein the function any( ) is a logical function that is true if $(mv_k - mv\_temporal_{i,j}(r,c)) > x\sigma_j$ is true for either the row or the column components of the motion vector $mv_k$;

$\sigma_j$ is the standard deviation of the motion vectors $mv_k$ of the overlapping blocks k in block j; and x is a constant greater than zero. In certain embodiments, the value of x is between 2 and 3.

Alternative or additional filters can be used. According to an alternative embodiment, only the motion vectors of the extrapolated blocks are subject to the filter of step 134. In another example, before calculating $mv\_temporal_{i,j}(r,c)$ in step 132, an intermediate filter that compares the overlapping area of the overlapping virtual block with the total overlapping area of the other block or blocks is implemented. If the area of the overlapping virtual block is greater than the remaining overlapping area, processing would advance to step 138, described below. If the area of the overlapping virtual block is less than the remaining overlapping area, the calculation of step 132 could be performed omitting the overlapping virtual block. In this embodiment, filtering in step 134 could still be performed for each motion vector of any extrapolated overlapping blocks, or the filtering in step 134 could be omitted. In still another embodiment, if the median filter described above is used in step 132 to calculate the temporal motion vectors, the filter of step 134 can be omitted.

When the filter in step 134 is applied, processing advances to step 136 to determine whether any motion vectors were filtered in step 134. If so, processing returns to step 130 to confirm if current block j continues to have overlapping blocks k. If so, $mv_t(r,c)$ is calculated again in step 132, the filter is applied again in step 134, and the query of step 136 is repeated. If the query of step 136 indicates that no motion vectors were filtered in step 136, processing advances to step 140 to query whether all blocks of frame i have been considered. If not, processing returns to step 128 to select the next block of frame i. If all blocks of frame i have been considered as indicated by a positive response to the query of step 140, the processing of FIG. 5 ends.

Referring back to step 130, if there are no overlapping blocks in current block j, $mv\_temporal(r,c)$ for the current block j of frame i is set equal to zero in step 138 before advancing to the query of step 140. As shown in FIG. 6B, for example, block (2,3) of frame i has no overlapping extrapolated blocks. Accordingly, the value $mv_t(2,3)$ is the zero vector and is not shown in FIG. 6C. The zero vector has a magnitude of zero and no direction.

Once the processing of FIG. 5 is completed, any temporally-predicted motion vectors $mv\_temporal(r,c)$ are available for use in temporal prediction of the content of blocks. They can be used in more than one way within existing motion estimation algorithms. For example, $mv\_temporal(r,c)$ could be used as a motion vector predictor in a mode similar to the new_mv mode. That is, a residual vector $mv\_res(r,c)$ can be calculated as $mv(r,c) - mv\_temporal(r,c)$, where $mv(r,c)$ is the best motion vector found by doing regular motion estimation, e.g. using diamond search where the motion search is initialized with $mv\_temporal(r,c)$ as the start vector. The residual vector $mv\_res(r,c)$ is encoded and transmitted, along with a code in header data indicating which mode and hence which motion vector is to be used in decoding the residual. Then, decoder 100 can decode $mv\_res(r,c)$ and add it to $mv\_temporal(r,c)$ as calculated and selected in its intra/inter prediction stage 108.

In another example, $mv\_temporal(r,c)$ and the temporal predictors of the neighboring blocks, $mv\_temporal(r-1,c-1)$, $mv\_temporal(r-1,c)$, $mv\_temporal(r,c-1)$, $mv\_temporal(r, c-1)$, ..., $mv\_temporal(r+1,c+1)$ can be added to the list of near motion vectors, e.g. mv_near, mv_nearest as additional modes. Any scoring and selection algorithm can then be used to select the best vector out of the expanded list, including the conventional motion estimation algorithms already used to select between motion vectors. A code indicating which of the modes, and hence which of the vectors is to be selected, is then transmitted as part of header data to decoder 100 so that decoder 100 selects the same motion vector during the calculations of its intra/inter prediction stage 108.

After the process 120 of FIG. 5 ends, the selected modes and motion vectors are used for encoding blocks according to known techniques by the stages of encoder 70. More generally, the output of encoder 70 is a compressed bitstream comprising slices or segments. According to one embodiment, each slice or segment is a complete decodable unit, which includes all motion vectors, quantization, macroblock modes, residual bitstreams and other desirable information to decode the one or more blocks of the unit.

When presented for decoding, the data elements within the bitstream can be decoded to produce a set of quantized transform coefficients. The quantized transform coefficients are dequantized then inverse transformed to produce a derivative residual that can be identical to that created by reconstruction stage 84 in encoder 70. Header information decoded from the bitstream is used by decoder 100 to calculate motion vectors and select the same motion vector as encoder 70 for use in intra/inter prediction stage 108 to identify the same prediction block as was used in encoder 70 to generate the residual. The prediction block is then added to the residual to create a reconstructed block. These steps may be performed for each block of a frame to be decoded. Filters can be applied to reduce blocking artifacts and/or blocking distortion before rendering a decoded frame.

According to the teachings herein, motion vector prediction can be used to exploit the temporal correlation of an object in motion across a number of frames. Specifically, by recognizing that such an object often has similar motion vectors from one frame to the next, temporal motion vectors can be calculated for prediction in a motion estimation algorithm. The use of such a motion vector can further compress the data by providing a better match between an existing block and a block to be predicted, thus generating a smaller residual for encoding.

The embodiments of encoding and decoding described above illustrate some exemplary encoding and decoding techniques. However, it is to be understood that encoding and decoding, as those terms are used in the claims, could mean compression, decompression, transformation, or any other processing or change of data.

The words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" throughout is not intended to mean the same embodiment unless described as such.

The embodiments of transmitting station 12 and/or receiving station 30 (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 12 and receiving station 30 do not necessarily have to be implemented in the same manner.

Further, in one embodiment, for example, transmitting station 12 or receiving station 30 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

Transmitting station 12 and receiving station 30 can, for example, be implemented on computers in a screencasting system. Alternatively, transmitting station 12 can be implemented on a server and receiving station 30 can be implemented on a device separate from the server, such as a handheld communications device (i.e. a cell phone). In this instance, transmitting station 12 can encode content using an encoder 70 into an encoded video signal and transmit the encoded video signal to the communications device. In turn, the communications device can then decode the encoded video signal using decoder 100. Alternatively, the communications device can decode content stored locally on the communications device, i.e. content that was not transmitted by transmitting station 12. Other suitable transmitting station 12 and receiving station 30 implementation schemes are available. For example, receiving station 30 can be a generally stationary personal computer rather than a portable communications device and/or a device including encoder 70 may also include decoder 100.

Further, all or a portion of embodiments of the present invention can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a video stream including a plurality of frames, the method comprising:
predicting an extrapolated position for a plurality of blocks of a first frame in a second frame using a respective motion vector used for inter-prediction of each of the plurality of blocks of the first frame, the second frame temporally subsequent to the first frame in a sequence of the plurality of frames;
calculating a temporal motion vector for a first block of the second frame as a combination of respective motion vectors of blocks overlapping the first block of the second frame using a processor, wherein at least a first block of the overlapping blocks is an extrapolated block at the extrapolated position and at least a second block of the overlapping blocks includes an area of the block of the second frame not overlapped by any extrapolated blocks, the motion vector for the at least the second block of the overlapping blocks being a zero vector when calculating the temporal motion vector;
using the temporal motion vector in a motion estimation algorithm to select a motion vector for the first block of the second frame; and
encoding the first block of the second frame using the selected motion vector.

2. The method of claim 1, further comprising:
setting a temporal motion vector for a second block of the second frame to zero when no extrapolated block overlaps the second block of the second frame.

3. The method of claim 1, further comprising:
applying a filter to the respective motion vectors of the overlapping blocks before using the temporal motion vector in the motion estimation algorithm.

4. The method of claim 1, further comprising:
applying a filter to the respective motion vectors of the overlapping blocks after calculating the temporal motion vector; and
recalculating the temporal motion vector before using the temporal motion vector in the motion estimation algorithm when at least one of the respective motion vectors is removed by the filter.

5. The method of claim 4 wherein the filter compares each of the respective motion vectors to the temporal motion vector.

6. The method of claim 4 wherein applying the filter comprises removing a motion vector $mv_k$ of a block k of the overlapping blocks if the difference between the motion vector $mv_k$ and the temporal motion vector is greater than a standard deviation of the motion vectors of the overlapping blocks.

7. The method of claim 1 wherein calculating the temporal motion vector comprises weighting the respective motion vectors of the overlapping blocks based on respective area of overlap between a respective overlapping block and the first block of the second frame.

8. The method of claim 1 wherein predicting the extrapolated position comprises predicting an extrapolated position for all blocks of the first frame except those blocks of the first frame referring to a reference frame other than a frame adjacent to the first frame in the sequence of the plurality of frames.

9. The method of claim 8, further comprising:
reviewing each block of the second frame for an existence of overlapping extrapolated blocks; and
calculating a temporal motion vector for each block of the second frame wherein the temporal motion vector for the block of the second frame is a zero vector when no extrapolated block overlaps the block of the second frame.

10. The method of claim 1, further comprising:
transmitting the encoded first block of the second frame and a code indicating which motion vector to select for decoding the first block of the second frame.

11. An apparatus for encoding a video stream having a plurality of frames, the apparatus comprising:
a memory; and
a processor configured to execute instructions stored in the memory to:
predict an extrapolated position for each block of a plurality of blocks of a first frame in a second frame using a respective motion vector used for inter-prediction of each of the plurality of blocks of the first frame, the second frame temporally subsequent to the first frame in a sequence of the plurality of frames;
calculate a temporal motion vector for a first block of the second frame as a combination of respective motion vectors of blocks overlapping the first block of the second frame, wherein at least a first block of the overlapping blocks is an extrapolated block at the extrapolated position and at least a second block of the overlapping blocks includes an area of the block of the second frame not overlapped by any extrapolated blocks, the motion vector for the at least the second block of the overlapping blocks being a zero vector when calculating the temporal motion vector;
use the temporal motion vector in a motion estimation algorithm to select a motion vector for the first block of the second frame; and
encode the first block of the second frame using the selected motion vector.

12. The apparatus of claim 11 wherein the processor further comprises:
a filter that receives the respective motion vectors of the overlapping blocks and the temporal motion vector, compares each of the respective motion vectors to the temporal motion vector and removes a motion vector of the respective motion vectors from a re-calculation of the temporal motion vector when a difference between that motion vector and the temporal motion vector is higher than a desired difference.

13. The apparatus of claim 11 wherein the processor is configured to set a temporal motion vector for a second block of the second frame to a zero vector when no extrapolated blocks overlap the second block of the second frame.

14. The apparatus of claim 11 wherein the processor is configured to use the temporal motion vector in a motion estimation algorithm by:
selecting one of a plurality of coding modes to encode the first block of the second frame, each of the plurality of coding modes indicating a respective motion vector to be used to encode the first block of the second frame, one of the respective motion vectors being the temporal motion vector for the first block of the second frame.

15. The apparatus of claim 11 wherein the processor is configured to use the temporal motion vector in a motion estimation algorithm by:
finding a best motion vector correlating a prediction block of the first frame with the first block of the second frame; and
calculating a residual vector for the first block of the second frame by subtracting the temporal motion vector from the best motion vector; and wherein the processor is configured to encode the residual vector.

16. The apparatus of claim 11 wherein the processor is configured to predict the extrapolated position $(r,c)_i$ of a block j of the first frame i−1 in the second frame i according to:

$$(r,c)_i = (r,c)_{i-1} - mv_{i-1,j};$$

wherein
$(r,c)_{i-1}$, is the position of the block j in the first frame i−1; and
$mv_{i-1,j}$ is the motion vector of the block j in the first frame i−1.

17. A method for decoding a video stream including a plurality of frames, the method comprising:
receiving a compressed bitstream including data representing a first frame, a second frame, motion vectors of the first frame and a code indicating how to select a motion vector for a block of the second frame;
decoding a plurality of blocks of the first frame;
predicting an extrapolated position for at least some of the plurality of decoded block of the first frame in the second frame using a respective motion vector used for inter-prediction of each of the at least some decoded blocks;
calculating a temporal motion vector for a first block of the second frame as a combination of respective motion vectors of blocks overlapping the first block of the second frame using a processor, wherein at least a first block of the overlapping blocks is an extrapolated block at the extrapolated position and at least a second block of the overlapping blocks includes an area of the block of the second frame not overlapped by any extrapolated blocks, the motion vector for the at least the second block of the overlapping blocks being a zero vector when calculating the temporal motion vector;
using the temporal motion vector in a motion estimation algorithm to select a motion vector for the first block of the second frame according to the code associated with the first block of the second frame; and
decoding the first block of the second frame using the selected motion vector.

18. The method of claim 17, further comprising:
applying a filter to the respective motion vectors of the overlapping blocks after calculating the temporal motion vector; and recalculating the temporal motion vector before using the temporal motion vector in the motion estimation algorithm when at least one of the respective motion vectors is removed by the filter.

19. The method of claim 17 wherein using the temporal motion vector in a motion estimation algorithm comprises:
using the code to select one of a plurality of coding modes to decode the first block of the second frame, the plurality of coding modes indicating a respective motion vector to be used to decode the first block of the second frame, one of the respective motion vectors being the temporal motion vector for the first block of the second frame.

* * * * *